Dec. 7, 1971   J. F. SANDERS   3,624,877
DESCALER FOR ROD AND THE LIKE
Filed Dec. 8, 1969   3 Sheets-Sheet 1

INVENTOR.
JAMES F. SANDERS
BY ATTORNEYS

INVENTOR.
JAMES F. SANDERS

BY
ATTORNEYS

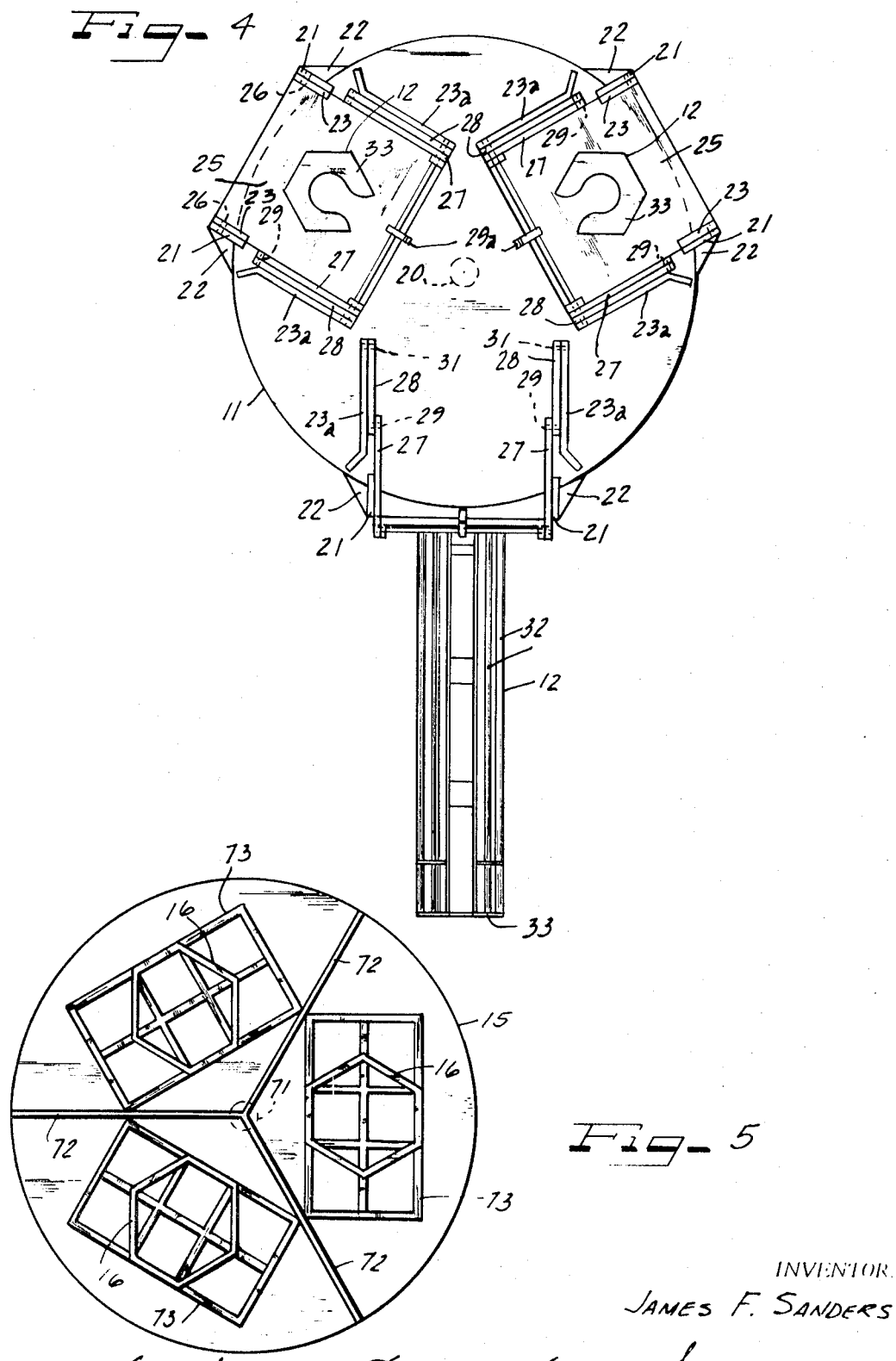

United States Patent Office 3,624,877
Patented Dec. 7, 1971

3,624,877
DESCALER FOR ROD AND THE LIKE
James F. Sanders, Sterling, Ill., assignor to Northwestern Steel and Wire Company, Sterling, Ill.
Filed Dec. 8, 1969, Ser. No. 883,039
Int. Cl. B21c 43/04
U.S. Cl. 29—81 A                                                11 Claims

ABSTRACT OF THE DISCLOSURE

Descaling apparatus and system including a turntable at the incoming end of the apparatus carrying a series of reels for bundles of rod. A second turntable for a series of reels is at the delivery end of the apparatus. The reels on the first turntable are pivoted to move from a horizontal loading position to a vertical pay-off position and are indexed, as loaded with rod beneath a guide basket. Bundles of coiled rod are placed on a reel when in a horizontal position, and as placed thereon, the trailing end of one bundle is welded to the leading end of the next bundle. The reel being full, is raised to a vertical position and as rod is paid off one reel a next adjacent full reel is indexed beneath the guide basket and the rod is trained from the basket about a series of overhead scale breaker rolls, downwardly about a second series of scale breaker rolls and then through a rod layer, laying the rod on a descaler block. The descaler block has downwardly turned guide stakes extending therefrom over a reel on the second turntable. The rod is picked from the descaler block and advanced along the guide stakes onto a reel on the second turntable. The descaling operation is a continuous operation and when the rod on one reel on the first turntable is paid off, its trailing end is welded to the leading end of the rod on a second reel.

SUMMARY AND OBJECTS OF INVENTION

Continuous mechanical system for descaling rod, operable to facilitate descaling by maintaining a continuous supply of bundles of rod and welding the leading and trailing ends of the bundles together to enable the rod layer to draw the rod through the system as long as bundles of rod are provided at the incoming end of the descaler. The bundles are continuously drawn from a succession of reels by welding the trailing end of one bundle to the leading end of the next adjacent bundle.

A principal object of the invention is to provide a mechanical means for removing scale from rod in which the operation of descaling the rod and laying the rod on reels is a continuous operation, as long as a supply of rod is maintained.

Another object of the invention is to provide a treating system for descaling ferrous rod, by passing the rod through a series of spaced scale breaker rolls in which reels at the incoming and delivery end of the system are carried on turntable and bundles of rod are loaded on a horizontally disposed reel at the incoming end of the system and the leading and trailing ends of the rod are welded together as placed on the reel, and the reel is then raised and indexed beneath a rod guide guiding the rod to descaling rolls, and as indexed beneath the rod guide, the leading end of the top bundle on the reel is welded to the trailing end of the rod passing from the first reel through the descaling rolls.

A still further object of the invention is to provide a descaler for rod and the like including a turntable at the incoming end of the descaler having a series of reels mounted thereon for movement into horizontal bundle receiving positions and upwardly into vertical pay-off positions as loaded, in which the turntable serves to index a full reel of rod to be drawn to the descaler rolls, as the bundles of rod on one reel have been uncoiled and are passing to the descaler rolls, and in which a continuous supply of rod is maintained by welding the trailing end of the rod of one bundle to the leading end of the rod of the next adjacent bundle, and welding the trailing end of the rod as uncoiled from its reel to the leading end of the rod being indexed into a descaling position.

Other objects features and advantages of the invention will be readily apparent from the following description of a certain preferred embodiment thereof, taken in conjunction with the accompanying drawings, although variations and modifications may be effected without departing from the spiirt and scope of the novel concepts of the disclosure.

DESCRIPTION OF THE DRAWINGS

FIG. 4 is a generally diagrammatic plan view of the turntable illustrating three reels on the turntable; and FIG. 5 is a generally diagrammatic plan view of the turntable at the delivery end of the descaler block.

DESCRIPTION OF PREFERRED EMBODIMENT OF INVENTION

Figure 1:
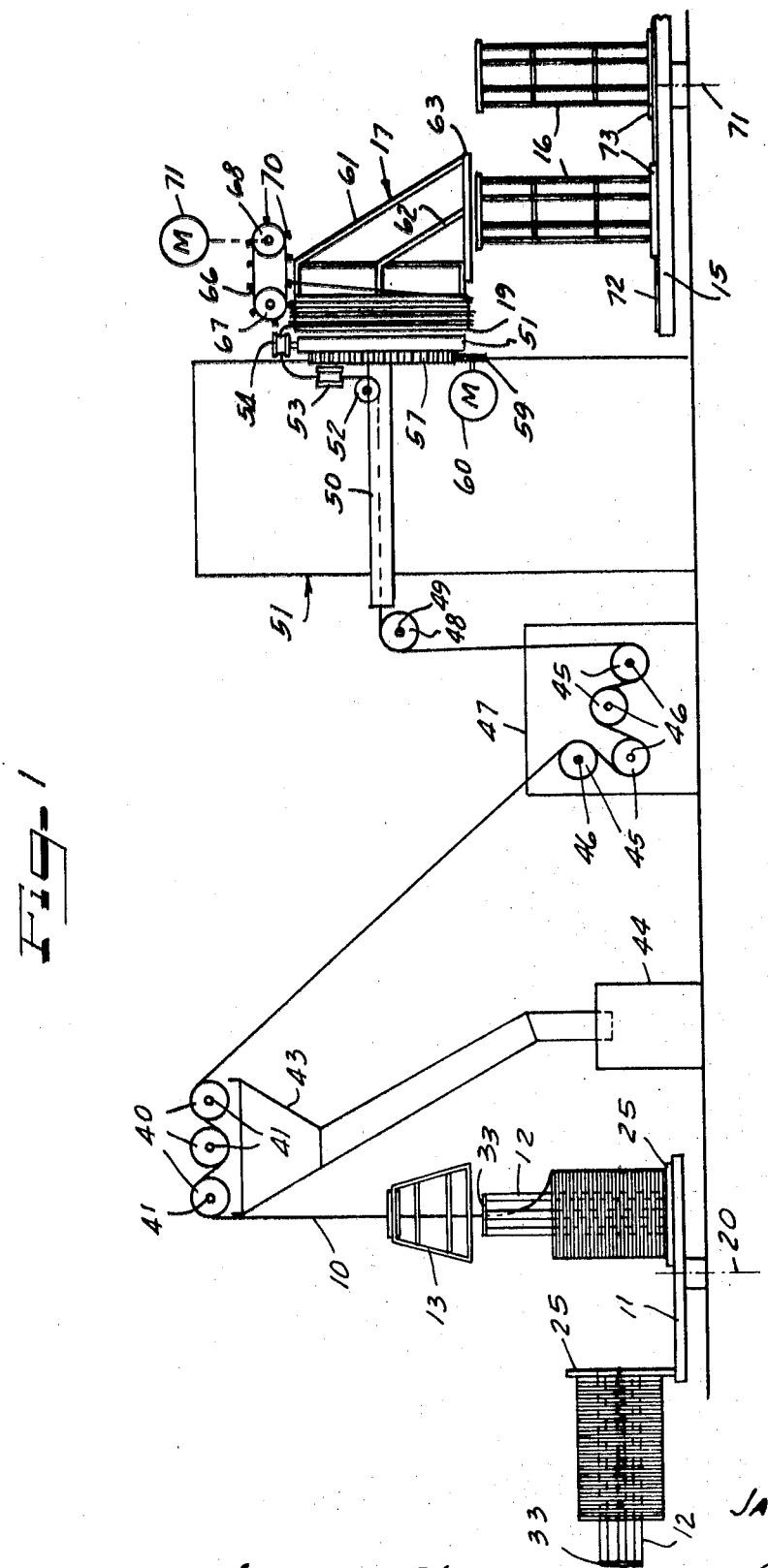
FIG. 1 is a diagrmmatic view of a descaler operating in accordance with the principles of the present invention, diagrammatically illustrating the rod supply, descaling and delivery steps of the system.

In FIG. 1 of the drawings, reference numeral 10 denotes a rod as received from a rolling mill, which may be a ferrous rod and has a surface coating of scale rigidly adhering thereto. Reference numeral 11 denotes a turntable at the incoming end of the descaling sytem having a series of reels or stems 12 pivotally carried thereon and indexed beneath a funnel-like guide basket 13 by a suitable indexing mechanism (not shown). Reference numeral 15 denotes a second turntable at the delivery end of the descaling apparatus having a plurality of stems or reels 16 removably carried thereon and successively positionable beneath a guide 17 extending horizontally outwardly of and inclined downwardly of a descaler block 19, and laying the descaled rod on a reel 16 in the form of a coil or bundle of rod.

Figure 2:
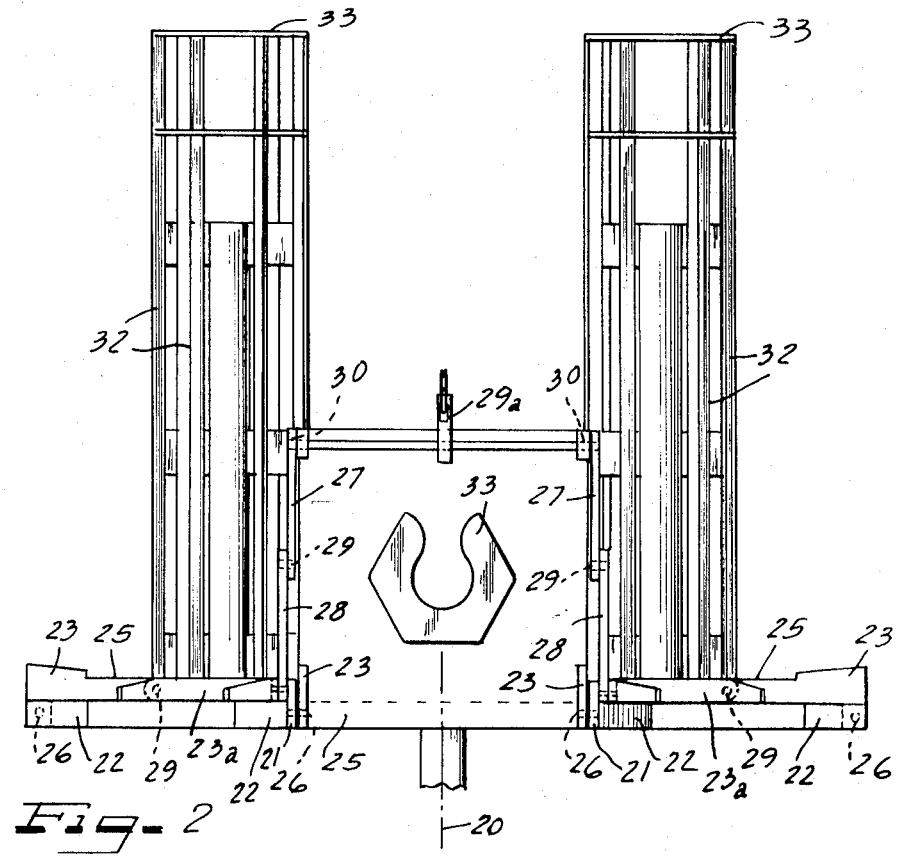
FIG. 2 is a diagrammatic view of a turntable at the incoming end of the descaler, showing one reel in a horizontal position and two other reels in vertical positions, with the rod removed.
Figure 3:
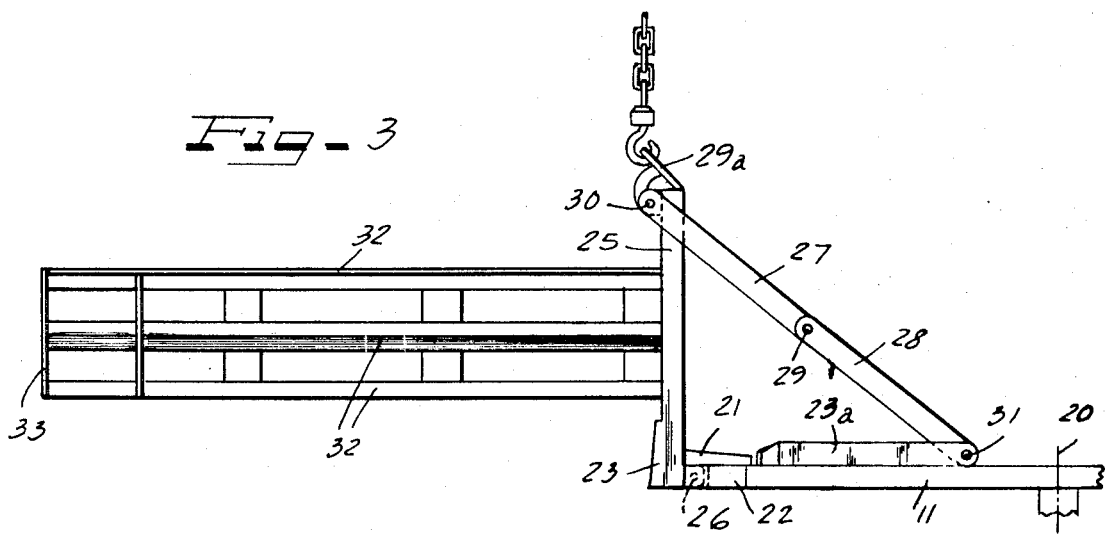
FIG. 3 is a diagrammatic fragmentary side elevational view of the reel in a horizontal rod receiving position.

In FIGS. 2, 3 and 4 of the drawings, the turntble 11 is shown as mounted for rotation about a vertical axis 20 and as having three reels 12 pivotally mounted thereon for movement about horizontal axes extending chordally of said turntable into horizontal positions extending radially outwardly of the turntable to be loaded with bundles or coils of rod. In loading a horizontally disposed reel, the trailing end of one bundle is welded to the leading end of a next adjacent bundle, as placed on the reel. The reel when loaded with rod is then moved into a vertical position to be indexed beneath a guide basket 13 as the rod is uncoiled from one reel and the turnable is positioned to move the empty reel from beneath the guide basket 13 and position a full reel thereunder and in registry therewith. As an empty reel is moved out of registry with the basket 13 and a full reel is movable into registry with said basket, the trailing end of the rod from the empty reel is welded to the leading end of the rod on the full reel, to continue the descaling operation without interruption.

The turntable 11, as shown in FIGS. 2 and 4, has three pairs of parallel rigs 21 extending beyond the periphery thereof, each pair of which ribs is spaced 120° apart. The other sides of said ribs are reinforced by gussets 22 extending from the periphery of said turntable. Base plates 25 for the stems or reels 12 have vertical mounting plates 23 extending along each side of the forward end portion thereof and depending therefrom. The mounting plates 23 are pivoted between the ribs 21 on pivot pins 26, disposed beneath the top surface of said base plate, and forwardly of the peripheral surface of said turntable. The pivot pins 26 and base plates 25 support the reels 12 for movement from horizontal loading position into vertical positions, to accommodate the paying of rod therefrom. The base plate 25 and reel 12 is held in a horizontal loading position by means of a pair of collapsible links 27 and 28 on each side of said base plate. Said links 27 and 28 are pivotally connected together at their adjacent ends on a pivot pin 29. Each link 27 is pivotally connected to the upper end of the base plate 25 on a pivot pin 30 when the reel is in a horizontal loading position. The link 28 is pivotally connected to the inside of a rib 23a on a pivot pin 31 extending along the top of the turntable. Links 27 and 28 are on each side of the base 25 and the ribs 23a extend along each side of said base. When the reel is raised into a vertical position as by a hoist and the like (not shown) hooked to a hook 29a at the back of the base, the links 27 and 28 will fold along each other along the insides of the ribs 23a and accommodate the base to rest on the turntable.

Each reel 12, as shown in FIGS. 2 and 3, is in the form of an elongated open framework, generally hexagonal in cross section and including a pair of parallel spaced elongated frame members or stakes 32, suitably connected together intermediate their ends and connected at their outer ends to an end frame member or collar 33. The collar 33 is open at its top when the reel is in a horizontal position, to accommodate a stripper to fit between said frame members in cases where it may be desired to strip the bundles of rod from the reel, and also to accommodate the hook of a hoist to extend between said frame members as loading the reel with bundles of rod when said reel is in a horizontal position.

The guide basket 13 is suitably supported in vertically spaced relation with respect to a turntable 11 and reels 12 mounted thereon, to guide the rod through said basket to descaling rolls 40, as a reel is indexed thereunder. The guide basket 13 is shown as being in the form of an open framework converging from its lower to its upper end to form a funnel-like guide for the rod traveling upwardly to said overhead descaler rolls 40.

The descaler rolls 40 are mounted for free rotation about horizontally extending shafts 41, suitably supported on a framework (not shown) above the delivery end of the basket 13. A major part of the scale is broken from the rod by these free rotating overhead rolls. A chute 43 is diagrammatically shown in FIG. 1 as disposed beneath the overhead rolls 40 to collect the scale broken from the rod and discharge the scale into a scale bucket 44 or other collector.

From the freely rotatable overhead rolls 40, 40, the rod is trained angularly downwardly and forwardly alternately over and under a series of final scale breaking rolls 45, journalled on horizontal shafts 46, for free rotation with respect thereto. The scale breaker rolls 45 are supported on a housing generally indicated by reference character 47 and diagrammatically shown in block form, and are also journalled on their shafts 46 for free rotation about said shafts.

While four descaler rolls 45 are shown herein, the number of scale breaker rolls may be varied and the training of rod alternately over and under the rolls may also be varied, depending upon the amount of scale left on the rod to be broken off by these rolls. The rod is trained upwardly from the outgoing descaler roll 45 to a sheave 48 suitably supported on a horizontal shaft 49, for free rotation with respect thereto. The rod is trained over the sheave 48 through a hollow shaft 50 of a rod layer 51. The rod layer 51 may operate on principles like those shown and described in Pat. No. 2,629,564, which issued to George W. Bell on Feb. 24, 1953. The rod layer, therefore, need not be shown or described in detail herein. The rod comes radially out the hollow shaft 50 about a sheave 52 rotatable about an axis transverse to the axis of said shaft 50 and is trained upwardly from said sheave along a sheave 53. The rod passes from the sheave 53 radially outwardly and about a freely rotatable sheave 54 mounted on a rotatably driven rod laying disk 55 and spaced outwardly therefrom. The rod layer disk 55 and sheave 54 are rotatable about the axis of the shaft 50 to lay the rod onto the non-rotatable descaler block 19 supported in front of the descaler disk 55. The hollow shaft 50, rod laying disk 55 and sheaves 52, 53 and 54 are rotatably driven about the axis of said shaft through a spur gear 57 diagrammatically shown as driven by reduction gearing 59 driven by a motor 60.

The guide stakes 17 include stakes 61 and 62 extending horizontally of the descaler block 19 adjacent the periphery thereof and angularly downwardly therefrom. The stakes 61 and 62 terminate at their lower ends at an open plate 63 and are welded or otherwise secured to said plate. Said plate is disposed above a stem or reel 16 on the turntable 15, and cooperates with said stakes 61 and 62 to guide the rod to be coiled about said reel in a conventional manner.

A pick-off chain 66 extends over the descaler block 19 and along said descaler block and along a top stake 62. Said pick-off chain is trained in an endless path about spaced sprockets 67 and 69 and has pick-off lugs 70 spaced therealong and extending therefrom. A motor and speed reducer indicated generally by reference character 71 is provided to drive the endless chain in a direction to pick the rod off the descaler block as coiled thereon, and move the coils of rod downwardly along the stakes 61 and 62 to fall in the form of a coil onto an empty reel 16 disposed in vertical alignment with the open collar 63.

The turntable 15 is mounted for rotation about a vertical axis 71 in either direction, and has locating dividers 72 extending along the top surface thereof to locate bases 73 of three reels or stems 16 on the turntable 120° apart, to support the reels for movement for registry with the discharge ends of the stakes 61 and 62 and collar 63. The empty reels are set on the turntable by a tractor or like apparatus and after one reel is filled with rod, the turntable is revolved to bring the empty reel under the stakes 61 and 62 to have the descaled rod coiled thereon, it being understood that the rod coiled on one reel is severed, as one reel or stem 16 is filled with descaled rod and the turntable is turned to remove the filled reel from beneath the stakes 61 and 62. At the same time, an empty stem or reel 16 is indexed under the stakes 61 and 62 and as this is done, the rod coiled on the one reel is severed and its trailing end is tied to the filled reel. The leading end of the descaled rod is then trained to be coiled about the next succeeding stem or reel indexed under the stakes 61 and 62.

In initially starting the descaling operation of welded bundles of coiled rod, the rod 10 is received from the rolling mill having a surface coating of scale rigidly adhering thereto is manually trained from a reel or stem 12 upwardly through the guide basket 13 and alternately over and under and over the overhead descaling rolls 40. From thence the rod is trained downwardly and and forwardly and alternately over and under the descaling rolls 45. The rod is then trained upwardly of the outgoing of said descaling rolls 40 about the sheave 48 through the hollow shaft 50 and out said hollow shaft about the sheaves 52 and 53 to and about the rod laying sheave 54 extending from the rod laying disk 55. From thence the rod is trained about the descaler block 19 and suitably attached to a stake 62. The motor 60 is then energized to rotatably drive the rod laying disk 55 and rod laying sheave 54 about the descaler block 19 and stakes 61 and 62. Assuming a reel 16 on the turntable 15 is in the centered relation with respect to the discharge ends of the stakes 61 and 62, the pick-up chain 66 is put into operation by energization of the drive motor therefor to drive the pick-off lugs 70 on said endless chain, to advance the coiled rod from the descaler block 19 downwardly along the stakes 61 and 62 to be discharged and coiled about an empty reel 16. As the rod progresses downwardly along the stakes, the leading end of the rod is severed from its stake 62, to accommodate the coiled rod to drop downwardly onto the reel 16 in the form of a continuous coil. As one reel is filled, the rod is severed and an empty reel is brought in position in alignment with the discharge ends of the stakes 61 and 62 to receive a second coil of rod. The full reel may be removed by a lift truck and the like as an empty reel is positioned in registry with the discharge ends of the stakes 61 and 62. As previously mentioned, the turntable 15 usually carries three reels 16, which are supplied thereto by lift trucks or other apparatus, and are successively indexed into position beneath the stakes 61 and 62 as one reel is full, to enable the coiling operation to be continuous without necessitating the shutting down of the machine.

After the rod has been manually trained to the descaler block and attached to a stake to enable the rod layer to lay the rod on said block and draw the rod through the descaler rolls 40, 40 and 45, 45, a full reel 12 may be on the turntable 11 in position to be moved into registry with the basket 13 as the reel, indexed in centered relation with the basket, becomes uncoiled. An empty reel 12 hinged downwardly to a horizontal position, as diagrammatically shown in FIGS. 1, 2 and 3, may then be loaded with bundles of rod, and as loaded, the trailing end of one bundle may be welded to the leading end of the next adjacent bundle loaded on the reel. Usually four bundles weighing approximately 1,000 lbs. each are loaded on a reel 12, and when the reel is loaded, it is moved upwardly into a vertical position by a hoist and the like, into position to be indexed by the turntable 11 under the basket 13 as the next adjacent reel is uncoiled and the trailing end of the rod on the next adjacent reel is welded to the leading end of the rod on the full reel. The reels as emptied may be hinged downwardly and loaded with bundles of rod with the leading and trailing ends of the rod of the bundles welded together as previously described.

It may be seen from the foregoing that when the apparatus is initially manually set up, the descaling operation may be continuous and the necessity of initially training the rod through the scale breaker rolls to be laid in a coil about the descaler block by the rod layer is obviated, and there need be no interruption in the descaling operation, which may continue for days at a time without necessitating the initial manual training of the rod through the descaler rolls to the rod layer.

I claim as my invention:

1. In a continuous system for descaling rod, the steps of:
   successively placing a series of bundles of coiled rod side-by-side in an aligned generally horizontal position, and while doing this,
   welding the adjacent ends of the rod together to form the bundles into a first continuous coil of rod,
   raising the bundles to a vertical positon with one bundle on top of the other,
   then training the leading end of the rod of the top bundle upwardly and through a series of descaling rolls and drawing the rod through the descaling rolls and
   then recoiling the descaled rod for discharge into a continuous coil of rod, and while doing this
   placing a second series of bundles of coiled rod in aligned side-by-side generally horizontal relation and welding the leading and trailing ends of the bundles together to form a second continuous coil of rod,
   then at the termination of uncoiling the first continuous coil of rod raising the second continuous coil of rod to a vertical position,
   indexing the second continuous coil of rod into position for descaling,
   training the leading end of the second continuous coil of rod to the trailing end of the first continuous coil of rod and welding the adjacent ends of the first and second continuous coils of rod together,
   and drawing the rod from the second coil solely by the recoiling operation of the first continuous coil of rod.

2. The continuous system of claim 1, including the steps of
   providing individual turntables at the incoming and delivery ends of the descaler,
   supporting a series of reels on each turntable,
   lowering an empty reel at the incoming end of the system into a horizontal position for loading and then
   raising the loaded reel into a vertical position for descaling, and
   supporting a series of empty reels on the turntable at the delivery end of the system in position to have the rod coiled thereon, and
   removing the full reel and positioning an empty reel in position to have rod coiled thereon.

3. A continuous system for descaling rod comprising the steps of:
   providing an incoming turntable having at least two reels, each reel adapted to have a plurality of bundles of rod loaded thereon and mounting the reels on said turntable for movement from a horizontal loading position to a vertical pay-off position,
   providing a guide basket above said turntable and reels and providing scale breaker rolls above said guide basket,
   moving one reel into horizontal position and placing bundles of rod thereon and while doing this, welding the leading end of the rod of one bundle to the trailing end of the rod of the next adjacent bundle to form a first continuous coil of rod,
   then raising the reel to a vertical position and indexing the turntable and reel and first continuous coil of rod to move the continuous coil of rod into registry with the guide basket and drawing the rod through said descaler rolls and recoiling the descaled rod and while performing the foregoing operations, placing a second series of bundles of rod on a second reel on said turntable and welding the leading ends of the bundles to the trailing ends of the next adjacent bundle to form a second continuous coil of rod, and welding the leading end of the second coil of rod to the trailing end of the first coil of rod, indexing the second coil of rod under the guide basket and drawing the second coil through the scale breaker rolls solely by the recoiling of the first coil of rod.

4. The continuous system for descaling rod in accordance with claim 3, including the additional steps of
   providing a rod layer to lay the rod in the form of a coil,
   manually training the rod from a vertical reel through the guide basket and scale breaker rolls to the rod layer, then
   putting the rod layer in operation to effect recoiling of the rod, and
   picking the coiled rod from the rod layer and continuing operation of the rod layer to continuously draw the rod from the reel on the incoming turntable.

5. A system of descaling rod in accordance with claim 4, including the additional steps of
   providing a descaling block having guide stakes extending therefrom at the delivery end of said rod layer,
   laying the rod on the descaler block by rotatably driving the rod layer,
   providing a turntable at the delivery end of the guide stakes, placing a plurality of reels thereon, indexing one reel to be coiled with rod beneath the guide stakes, then picking the coiled rod on the descaler block to move along the guide stakes and fall on the reel indexed beneath the guide stakes in the form a coil.

6. An apparatus for descaling rod comprising, a turntable, a series of reels supported on said turntable, a guide basket disposed above said turntable, a series of scale breaker rolls disposed above and in alignment with said guide basket, means for drawing rod upwardly through said guide basket and alternately about said scale breaker rolls and coiling the rod for delivery, said reels each including a base having a reel frame extending upwardly therefrom, means pivotally mounting each base on said turntable for movement about a horizontal axis extending generally chordally of said turntable and spaced about said turntable equal distances and accommodating positioning of the associated reel into a horizontal loading position, and into a vertical paying off position, a series of collapsible links pivotally connected together at their adjacent ends and pivotally connected to said turntable at one end of the links and to said base at the opposite end of the links for retaining the reel in a horizontal position for loading bundles of coiled rod thereon, and said links folding along each other upon upward lifting movement of said reel into a vertical position to accommodate the paying of rod from said reel through said guide basket as moved into alignment with said guide basket by indexing movement of said turntable.

7. The apparatus for descaling rod in accordance with claim 6, wherein a second turntable rotatable about a vertical axis is provided at the delivery end of the apparatus and is adapted to have a plurality of reels placed thereon to successively have the descaled rod coiled thereon.

8. The apparatus for descaling rod in accordance with claim 7, wherein the means for drawing rod upwardly through said guide basket and scale breaker rolls includes a rod layer and a descaler block in advance of said rod layer having stakes extending therefrom opening for registry with the reel on said second turntable.

9. The apparatus for descaling rod in accordance with claim 8, including an endless traveling pick-off disposed above said descaler block and stakes and having pick-off lugs extending therefrom, picking the rod from said descaler block and advancing the rod along said stakes for discharge onto a reel disposed therebeneath.

10. The descaling apparatus of claim 9, wherein a second series of scale breaker rolls is disposed beneath and in advance of the first series of scale breaker rolls and on the incoming side of said rod layer and descaler block.

11. The apparatus of claim 10, wherein power means are provided to rotatably drive said rod layer, and wherein other power means are provided to drive said pick-off to effect picking of the rod from said descaler block and advance of the rod along said stakes for discharge onto a reel on said second turntable in registry with said stakes.

References Cited

UNITED STATES PATENTS

| | | | |
|---|---|---|---|
| 2,263,889 | 11/1941 | Rose | 242—129 |
| 2,743,066 | 4/1956 | Crum | 242—79 |
| 3,082,973 | 3/1963 | Bittman | 242—129 |
| 3,154,442 | 10/1964 | Nye et al. | 29—81 A X |

H. HAMPTON HUNTER, Primary Examiner

U.S. Cl. X.R.

29—81 F; 242—82, 129